(12) United States Patent
Mital et al.

(10) Patent No.: US 8,873,550 B2
(45) Date of Patent: Oct. 28, 2014

(54) TASK QUEUING IN A MULTI-FLOW NETWORK PROCESSOR ARCHITECTURE

(71) Applicant: LSI Corporation, Milpitas, CA (US)

(72) Inventors: Deepak Mital, Orefield, PA (US); William Burroughs, Macungie, PA (US); Michael R. Betker, Orefield, PA (US); Joseph R. Hasting, Orefield, PA (US)

(73) Assignee: LSI Corporation, Milpitas, CA (US)

( * ) Notice: Subject to any disclaimer, the term of this patent is extended or adjusted under 35 U.S.C. 154(b) by 160 days.

(21) Appl. No.: 13/687,772

(22) Filed: Nov. 28, 2012

(65) Prior Publication Data

US 2013/0086332 A1    Apr. 4, 2013

Related U.S. Application Data

(63) Continuation-in-part of application No. 12/782,379, filed on May 18, 2010, and a continuation-in-part of application No. 12/782,393, filed on May 18, 2010, now Pat. No. 8,255,644, and a continuation-in-part of application No. 12/782,411, filed on May 18, 2010, now Pat. No. 8,407,707.

(60) Provisional application No. 61/564,811, filed on Nov. 29, 2011.

(51) Int. Cl.

| G06F 9/455 | (2006.01) |
|---|---|
| G06F 9/46 | (2006.01) |
| H04L 12/931 | (2013.01) |
| G06F 15/167 | (2006.01) |
| G06F 12/00 | (2006.01) |
| H04L 12/933 | (2013.01) |
| G06F 9/54 | (2006.01) |

(52) U.S. Cl.
CPC .............. *G06F 12/00* (2013.01); *H04L 49/506* (2013.01); *G06F 15/167* (2013.01); *H04L 49/109* (2013.01); *H04L 49/101* (2013.01); *G06F 9/544* (2013.01)

USPC ............................................ 370/389; 712/30

(58) Field of Classification Search
None
See application file for complete search history.

(56) References Cited

U.S. PATENT DOCUMENTS

| 4,123,795 A | 10/1978 | Dean, Jr. et al. |
|---|---|---|
| 4,622,631 A | 11/1986 | Frank et al. |

(Continued)

FOREIGN PATENT DOCUMENTS

JP    H02-271444    11/1990

OTHER PUBLICATIONS

Alan H. Karp and Rajiv Gupta, "Hardware Assist for Data Merging for Shared Memory Multiprocessors", Hewlett-Packard Labs, Palo Alto, CA, Mar. 13, 1994.

(Continued)

*Primary Examiner* — Corey S Faherty
(74) *Attorney, Agent, or Firm* — Daniel J Santos; Smith Risley Tempel Santos LLC (57) ABSTRACT

Described embodiments generate tasks corresponding to each packet received by a network processor. A destination processing module receives a task and determines, based on the task size, a queue in which to store the task, and whether the task is larger than space available within a current memory block of the queue. If the task is larger, an address of a next memory block in a memory is determined, and the address is provided to a source processing module of the task. The source processing module writes the task to the memory based on a provided offset address and the address of the next memory block, if provided. If a task is written to more than one memory block, the destination processing module preloads the address of the next memory block to a local memory to process queued tasks without stalling to retrieve the address of the next memory block.

20 Claims, 4 Drawing Sheets

(56) References Cited

U.S. PATENT DOCUMENTS

| | | |
|---|---|---|
| 5,394,534 A | 2/1995 | Kulakowski et al. |
| 5,623,698 A | 4/1997 | Stephenson et al. |
| 5,838,931 A | 11/1998 | Regenold et al. |
| 5,892,766 A | 4/1999 | Wicki et al. |
| 5,893,120 A | 4/1999 | Nemes |
| 5,909,695 A | 6/1999 | Wong et al. |
| 5,943,283 A | 8/1999 | Wong et al. |
| 5,974,421 A | 10/1999 | Krishnaswamy et al. |
| 6,026,467 A | 2/2000 | Petty |
| 6,038,630 A | 3/2000 | Foster et al. |
| 6,052,697 A | 4/2000 | Bennett et al. |
| 6,115,802 A | 9/2000 | Tock et al. |
| 6,195,335 B1 | 2/2001 | Calvignac et al. |
| 6,216,167 B1 | 4/2001 | Momirov |
| 6,233,246 B1 | 5/2001 | Hareski et al. |
| 6,289,013 B1 | 9/2001 | Lakshman et al. |
| 6,341,130 B1 | 1/2002 | Lakshman et al. |
| 6,567,564 B1 | 5/2003 | van der Wal |
| 6,584,546 B2 | 6/2003 | Kavipurapu |
| 6,636,932 B1 | 10/2003 | Regev et al. |
| 6,658,012 B1 | 12/2003 | Baucom, Jr. et al. |
| 6,839,830 B2 | 1/2005 | Liu |
| 6,907,469 B1 | 6/2005 | Gallo et al. |
| 6,914,882 B2 | 7/2005 | Merani et al. |
| 7,058,057 B2 | 6/2006 | Dooley et al. |
| 7,085,911 B2 | 8/2006 | Sachedina et al. |
| 7,089,346 B2 | 8/2006 | Cebulla et al. |
| 7,159,219 B2 | 1/2007 | Chen et al. |
| 7,234,018 B1 | 6/2007 | Purcell et al. |
| 7,287,046 B2 | 10/2007 | Bulka et al. |
| 7,397,809 B2 | 7/2008 | Wang |
| 7,453,898 B1 | 11/2008 | Cohen et al. |
| 7,461,208 B1 | 12/2008 | Caprioli et al. |
| 7,461,407 B2 | 12/2008 | Little et al. |
| 7,512,740 B2 | 3/2009 | Diefendorff |
| 7,519,065 B2 | 4/2009 | Angle et al. |
| 7,525,962 B2 * | 4/2009 | Kounavis et al. ............. 370/389 |
| 7,554,464 B1 | 6/2009 | Oberdorfer |
| 7,594,028 B1 | 9/2009 | Jacobs et al. |
| 7,596,142 B1 | 9/2009 | MacAdam |
| 7,600,078 B1 | 10/2009 | Cen et al. |
| 7,659,894 B2 | 2/2010 | Keller et al. |
| 7,660,259 B1 | 2/2010 | Grosser et al. |
| 7,710,988 B1 | 5/2010 | Tripathi et al. |
| 7,720,055 B2 | 5/2010 | Kadambi et al. |
| 7,849,315 B2 | 12/2010 | Hardy et al. |
| 7,886,150 B2 | 2/2011 | Stollon et al. |
| 8,127,350 B2 | 2/2012 | Wei et al. |
| 8,140,759 B2 | 3/2012 | Frey et al. |
| 2002/0029214 A1 | 3/2002 | Yianilos et al. |
| 2002/0165985 A1 | 11/2002 | Chen et al. |
| 2003/0033276 A1 | 2/2003 | Cheng et al. |
| 2003/0115417 A1 | 6/2003 | Corrigan |
| 2003/0123468 A1 | 7/2003 | Nong |
| 2004/0255209 A1 | 12/2004 | Gross |
| 2005/0027920 A1 | 2/2005 | Fitzsimmons et al. |
| 2005/0141537 A1 | 6/2005 | Kumar et al. |
| 2005/0152352 A1 | 7/2005 | Jun et al. |
| 2006/0029079 A1 | 2/2006 | Cohen et al. |
| 2006/0153184 A1 * | 7/2006 | Kounavis et al. ............. 370/389 |
| 2006/0256783 A1 | 11/2006 | Ayrapetian et al. |
| 2007/0011396 A1 | 1/2007 | Singh et al. |
| 2007/0016756 A1 | 1/2007 | Hsieh et al. |
| 2007/0043856 A1 | 2/2007 | Morris et al. |
| 2007/0226798 A1 | 9/2007 | Sibert |
| 2007/0271374 A1 | 11/2007 | Shomura et al. |
| 2008/0077928 A1 | 3/2008 | Matsuzaki et al. |
| 2008/0092092 A1 | 4/2008 | Dalton et al. |
| 2008/0162793 A1 | 7/2008 | Chu et al. |
| 2008/0239992 A1 | 10/2008 | Krasnyanskiy |
| 2008/0240103 A1 | 10/2008 | Schmidt |
| 2008/0240106 A1 | 10/2008 | Schlenk |
| 2009/0019270 A1 | 1/2009 | Halter et al. |
| 2009/0271562 A1 | 10/2009 | Sinclair |
| 2010/0260198 A1 | 10/2010 | Rojas-Cessa et al. |
| 2010/0293353 A1 * | 11/2010 | Sonnier et al. ................ 711/170 |
| 2011/0219195 A1 | 9/2011 | Habusha et al. |
| 2012/0300772 A1 * | 11/2012 | Manzella et al. ............. 370/389 |

OTHER PUBLICATIONS

Sundaram, Chandra, Goyal, Shenoy, Sahni, Vin. "Application Performance in the QLinux Multimedia Operating System", ACM Multimedia, Los Angeles, CA (2000).

Lu, Sheng, Dinda. "Size-based Scheduling Policies with Inaccurate Scheduling Information", Proceedings of the IEEE Computer Society's 12th Annual International Symposium on Modeling, Analysis, and Simulation of Computer and Telecommunications Systems (2004).

Schurgers, Raghunathan, Srivastava. "Modulation Scaling for Real-time Energy Aware Packet Scheduling", IEEE, Nov. 2001.

Chiueh et al., "High-Performance IP Routing Table Lookup Using CPU Caching", IEEE (1999).

\* cited by examiner

TASK QUEUING IN A MULTI-FLOW NETWORK PROCESSOR ARCHITECTURE

CROSS-REFERENCE TO RELATED APPLICATIONS

This application claims the benefit of the filing date of U.S. provisional application No. 61/564,811 filed Nov. 29, 2011, the teachings of which are incorporated herein in their entireties by reference.

This application is a continuation-in-part, and claims the benefit of the filing date, of U.S. patent application Ser. No. 12/782,379 filed May 18, 2010, Ser. No. 12/782,393 filed May 18, 2010, now issued as U.S, Pat. No. 8,255,644, and Ser. No. 12/782,411 filed May 18, 2010, now issued as U.S. Pat. No. 8,407,707, the teachings of which are incorporated herein in their entireties by reference.

The subject matter of this application is related to U.S. patent application Ser. No. 12/430,438 filed Apr. 27, 2009, now issued as U.S. Pat. No. 8,352,669, Ser. No. 12/729,226 filed Mar. 22, 2010, Ser. No. 12/729,231 filed Mar. 22, 2010, now issued as U.S. Pat. No. 8,473,657, Ser. No. 12/963,895 filed Dec. 9, 2010 now issued as U.S. Pat. No. 8,499,137, Ser. No. 12/971,742 filed Dec. 17, 2010, Ser. No. 12/974,477 filed Dec. 21, 2010, Ser. No. 12/975,823 filed Dec. 22, 2010, now issued as U.S. Pat. No. 8,505,013, Ser. No. 12/975,880 filed Dec. 22, 2010, now issued as U.S. Pat. No. 8,514,874, Ser. No. 12/976,045 filed Dec. 22, 2010, Ser. No. 12/976,228 filed Dec. 22, 2010, Ser. No. 12/979,551 filed Dec. 28, 2010, now issued as U.S. Pat. No. 8,489,791, Ser. No. 12/979,665 filed Dec. 28, 2010, now issued as U.S. Pat. No. 8,489,792, Ser. No. 12/979,800 filed Dec. 28, 2010, now issued as Pat. No. 8,489,794, Ser. No. 13/046,717 filed Mar. 12, 2011, Ser. No. 13/046,719 filed Mar. 12, 2011, now issued as U.S. Pat. No. 8,321,385, Ser. No. 13/046,726 filed Mar. 12, 2011, Ser. No. 13/192,104 filed Jul. 27, 2011, Ser. No. 13/192,140 filed Jul. 27, 2011, Ser. no. 13/192,187 filed Jul. 27, 2011, Ser. No. 13/232,422 filed Sep. 14, 2011, Ser. No. 13/250,898 filed Sep. 30, 2011, Ser. No. 13/274,726 filed Oct. 17, 2011, Ser. No. 13/310,961 filed Dec. 5, 2011, Ser. No. 13/316,145 filed Dec. 9, 2011, 13/359,690 filed Jan. 27, 2012, Ser. No. 13/405,053 filed Feb. 23, 2012, Ser. No. 13/403,468 filed Feb. 23, 2012, Ser. No. 13/409,432 filed Mar. 1, 2012, Ser. no. 13/474,114 filed May 17, 2012, Ser. No. 13/480,623 filed May 25, 2012, Ser. No. 13/568,365 filed Aug. 7, 2012, Ser. No. 13/687,719 filed Nov. 28, 2012, Ser. No. 13/687,865 filed Nov. 28, 2012, Ser. No. 13/687,911 filed Nov. 28, 2012, Ser. No. 13/687,958 filed Nov. 28. 2012, and Ser. no. 13/687,971 filed Nov. 28, 2012, the teachings of all of which are incorporated herein in their entireties by reference.

BACKGROUND

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors had diminishing performance improvements, or might actually slow down overall network processor throughput. Newer designs add hardware accelerators in a system on chip (SoC) architecture to offload certain tasks from the general-purpose processors, such as encryption/decryption, packet data inspections, and the like. These newer network processor designs are traditionally implemented with either i) a non-pipelined SoC architecture or ii) a fixed pipeline SoC architecture.

In a typical non-pipelined SoC architecture, general-purpose processors are responsible for each action taken by acceleration functions. A non-pipelined SoC architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline SoC architecture, packet data flows through the general-purpose processors and/or accelerators in a fixed sequence regardless of whether a particular processor or accelerator is required to process a given packet. For example, in a fixed sequence, a single accelerator within the fixed pipeline cannot be employed without employing the entire fixed pipeline. This fixed sequence might add significant overhead to packet processing and has limited flexibility to handle new protocols, limiting the advantage provided by using the accelerators.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide processing of a received packet of a network processor by generating one or more tasks corresponding to each received packet. A destination processing module receives a task and determines, based on the task size, an associated queue in which to store the task, and whether the task is larger than space available within a current memory block of the associated queue. If the task is larger than space available within the current memory block of the associated queue, an address of a next memory block in a shared memory is determined, and the address is provided to a source processing module of the task. The source processing module writes the task to the shared memory based on a provided offset address and the address of the next memory block, if provided. If a task is written to more than one memory block, the destination processing module preloads the address of the next memory block to a local memory to process queued tasks without stalling to retrieve the address of the next memory block from the shared memory.

BRIEF DESCRIPTION OF THE DRAWING FIGURES

Other aspects, features, and advantages of described embodiments will become more fully apparent from the following detailed description, the appended claims, and the accompanying drawings in which like reference numerals identify similar or identical elements.

DETAILED DESCRIPTION

Described embodiments provide processing of a received packet of a network processor by generating one or more tasks corresponding to each received packet. A destination processing module receives a task and determines, based on the task size, an associated queue in which to store the task, and whether the task is larger than space available within a current memory block of the associated queue. If the task is larger than space available within the current memory block of the associated queue, an address of a next memory block in a shared memory is determined, and the address is provided to a source processing module of the task. The source processing module writes the task to the shared memory based on a provided offset address and the address of the next memory block, if provided. If a task is written to more than one memory block, the destination processing module preloads the address of the next memory block to a local memory to process queued tasks without stalling to retrieve the address of the next memory block from the shared memory.

Table 1 defines a list of acronyms employed throughout this specification as an aid to understanding the described embodiments of the present invention:

TABLE 1

| | |
|---|---|
| USB | Universal Serial Bus |
| SATA | Serial Advanced Technology Attachment |
| SCSI | Small Computer System Interface |
| SAS | Serial Attached SCSI |
| PCI-E | Peripheral Component Interconnect Express |
| SoC | System-on-Chip |
| AXI | Advanced eXtensible Interface |
| AMBA | Advanced Microcontroller Bus Architecture |
| PAB | Packet Assembly Block |
| MTM | Modular Traffic Manager |
| DBC | Data Buffer Controller |
| HE | Hash Engine |
| SENG | State Engine |
| TID | Task Identifier |
| OUL | Oldest Unspecified List |
| SCH | Scheduler |
| SPP | Security Protocol Processor |
| TIL | Task Input Logic |
| TCP | Transmission Control Protocol |
| IP | Internet Protocol |
| FIFO | First-In, First-Out |
| I/O | Input/Output |
| DDR | Double Data Rate |
| DRAM | Dynamic Random Access Memory |
| MMB | Memory Manager Block |
| μP | Microprocessor |
| PLB | Processor Local Bus |
| MPP | Modular Packet Processor |
| AAL5 | ATM Adaptation Layer 5 |
| SED | Stream Editor |
| TID | Thread Identifier |
| PQM | Pre-Queue Modifier |
| FBI | Function Bus Interface |
| CCL | Classification Completion List |
| OC | Ordered Call |
| SEM | Semaphore Engine |
| PCM | Per Context Memory |
| PDU | Protocol Data Unit |
| PIC | Packet Integrity Checker |
| CRC | Cyclic Redundancy Check |

Figure 1:
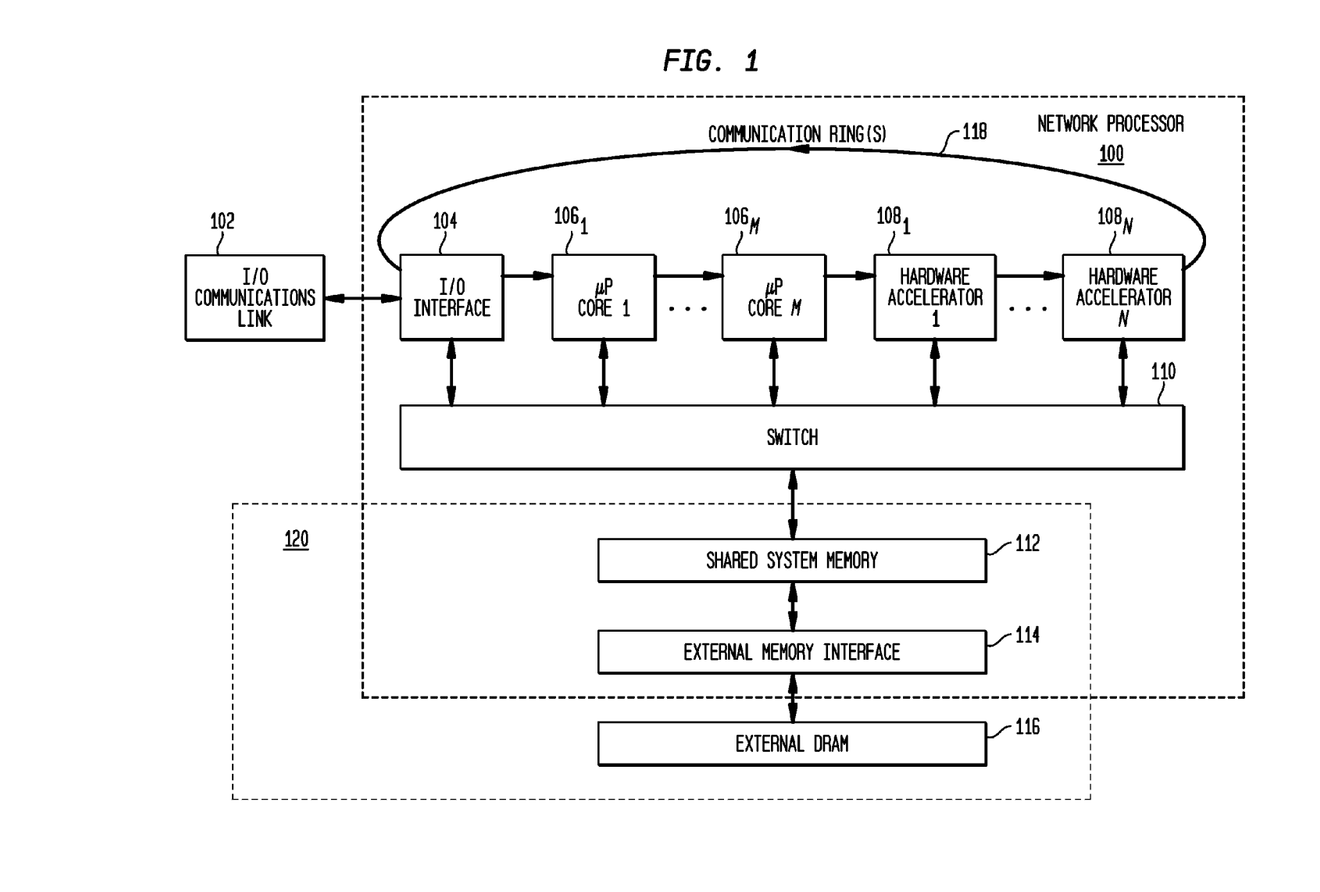
FIG. 1 shows a block diagram of a network processor operating in accordance with exemplary embodiments.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (μP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, μP cores and hardware accelerators might be coupled through switch 110 to shared memory 112. Switch 110 might be implemented as a non-blocking crossbar switch such as described in related U.S. patent applications Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In embodiments of the present invention, shared memory 112 is a conventional memory operating as a cache that might be allocated and/or subdivided. For example, shared memory 112 might include one or more FIFO queues that might be dynamically allocated to the various μP cores 106 and hardware accelerators 108. External memory interface 114 couples shared memory 112 to one or more external memories, shown as external memory 116, to provide off-chip storage of data not currently in use by the various μP cores 106 and hardware accelerators 108 to free space in shared memory 112. As indicated by the dashed line, shared memory 112 and external memory 116 might generally be referred to as system memory 120. In general, system memory 120 might be addressed as a single address space such that various accelerators 108 can seamlessly request data whether the data is stored in shared memory 112 or external memory 116.

Hardware accelerators 108 might interact with each other, for example, by one or more communication bus rings 118 that pass "tasks" from a source core to a destination core. Tasks allow network processor 100 to process a wide variety of data and control messages more efficiently than with a fixed pipeline or non-pipelined architecture. As discussed in more detail below, the sequence of processing of the tasks depends on i) the type of packet and ii) the type of processing performed by the various cores on a particular packet (or group of packets), control message, or other data. This is referred to herein as a "Virtual Pipeline™", a trademark of LSI Corporation, of Milpitas, Calif. In embodiments of the present invention, each of a plurality of virtual pipelines operate by each processing module of network processor 100 receiving a task, executing that task, and assigning a subsequent task to another (or the same) processing module depending on an identification of a virtual pipeline corresponding to the task. As described herein, tasks are instructions to the destination core to perform certain functions, and a task might be passed substantially as described in related U.S. patent applications Ser. Nos. 12/782,379, 12/782,393, and 12/782,411 all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112.

I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted out of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various μP cores 106 and hardware accelerators 108 of network processor 100 might include several exemplary types of processors or accelerators. For example, the various μP cores 106 might be implemented as Pentium®, Power PC® or ARM processors or a combination of different processor types (Pentium® is a registered trademark of Intel Corporation, ARM processors are by ARM Holdings, plc, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions. The MTM might operate substantially as described in related U.S. patent application Ser. No. 13/232,422, filed Sep. 14, 2011 and Ser. No. 13/250,898 filed Sep. 30, 2011, which are incorporated by reference herein.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The RegEx engine is a packet search engine for state-based cross-packet pattern matching. The RegEx engine is a multi-threaded accelerator. An exemplary RegEx engine might be implemented such as described in U.S. Pat. No. 7,430,652 to Hundley, U.S. Pat. No. 7,899,904 to Ruehle and U.S. Pat. No. 7,512,592 to Lemoine, the teachings of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in shared memory 112 might be dynamically allocated by the MMB to store data, with the blocks in one of the following sizes: 256, 2048, 16384, and 65536 bytes. The MMB might operate substantially as described in related U.S. patent application Ser. No. 12/963,895 filed Dec. 9, 2010 and Ser. No. 13/359,690 filed Jan. 27, 2012, the teachings of which are incorporated by reference herein.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, and Ser. No. 13/405,053 filed Feb. 23, 2012, the teachings of which are incorporated by reference herein.

The MPP is a multi-threaded special purpose processor that provides tree based longest prefix and access control list classification. The MPP also has a hardware hash-based classification capability with full hardware management of hashtable additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files. The MPP might operate substantially as described in related U.S. patent application Ser. No. 12/974,477 filed Dec.21, 2010, Ser. Nos. 12/975,823, 12/975,880, 12/976,045, and 12/976,228 all filed Dec. 22, 2010 and Ser. No. 13/474,114 filed May 17, 2012, the teachings of which are incorporated by reference herein. The MPP might also include hash functionality such as described in related U.S. patent application Ser. Nos. 13/046,717, 13/046,719, and 13/046,726 all filed Mar. 12, 2011, Ser. No. 13/403,468 filed Feb. 23, 2012 and Ser. No. 13/474,114 filed May 17, 2012, the teachings of which are incorporated by reference herein.

Figure 2:
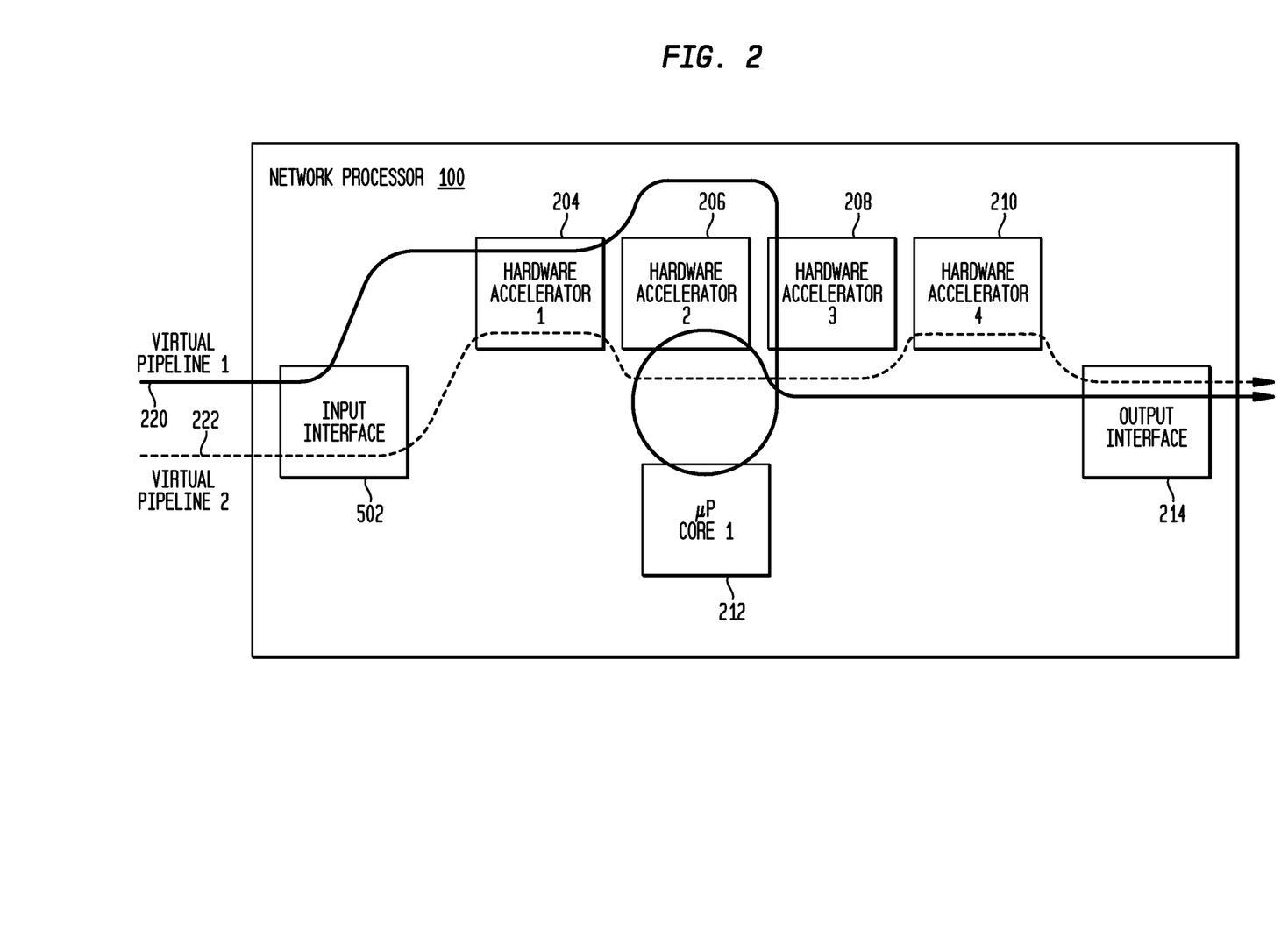
FIG. 2 shows an exemplary data flow of two virtual pipelines through the network processor of FIG. 1.

In exemplary embodiments, virtual pipelines might be defined that determine (1) a flow sequence of processing modules to be used for the task, (2) for each processing module, the required command and parameter fields, and (3) for each field, the source module of data output from a previous engine in the virtual pipeline or data that is constant for the pipeline. FIG. 2 shows a flow of two exemplary virtual pipelines through network processor 100. FIG. 2 shows a first virtual pipeline sequence 220 for processing an exemplary packet, and a second virtual pipeline 222 for processing another exemplary packet. As shown in FIG. 2, virtual pipeline 220 defines a processing order starting at input interface 202 (such as the I/O interface 104 of FIG. 1), hardware accelerator 204, hardware accelerator 208, µP core 212, hardware accelerator 206, and finally output interface 214. However, another packet received by the input interface 202 might be processed in accordance with second virtual pipeline 222. As shown in FIG. 2, virtual pipeline 222 also defines a processing order starting at input interface 202 and hardware accelerator 204 but then proceeds to hardware accelerator 210 and then output interface 214. Processor core 212 and hardware accelerator 206 and 208 are not included in virtual pipeline 222. Because only those hardware accelerators and µP cores that are required are included in a virtual pipeline, network processor 100 has increased efficiency of processing data packets.

As described herein, tasks are primary means of communication between hardware accelerators 108 of network processor 100. As described, a task is a request from a source processing module to a destination processing module for the destination module to perform some processing task. A task might contain packet data, commands, metadata, pointers, control and parameter data, and other information, such as a priority level and flow ID.

The destination processing module might typically store multiple varibaled-sized data blocks of tasks in an associated queue within shared system memory 112. In some embodiments, each processing module might have multiple task queues associated therewith. In an exemplary embodiment, the task blocks might typically be 2kB. Assigning a task to a particular queue might depends on any one or more of several factors, such as whether the tasks are ordered tasks or unordered tasks, the number of tasks in a given queue, and the size or depth of the queue. Ordered task queues might support parallel processing of tasks while keeping tasks for a given flow in order, while unordered tasks can be processed in any order.

Figure 3:
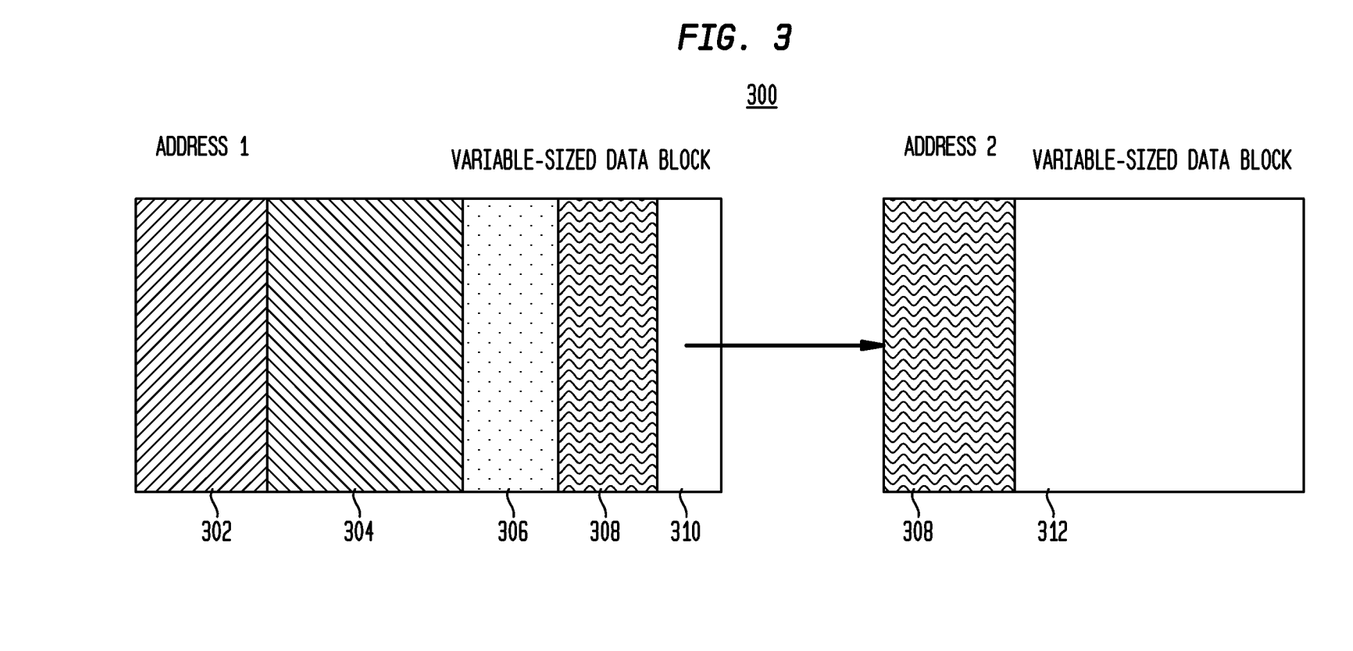
FIG. 3 shows a block diagram of an exemplary task queue structure of processing modules of the network processor of FIG. 1.

When the associated varibaled-sized data block becomes full, the destination processing module sends two addresses in the response to the sourcing engine: (i) the address with the first varibaled-sized data block to start writing the task, and (ii) the beginning address of a next varibaled-sized data block in shared system memory 112. FIG. 3 shows a block diagram of an exemplary task queue structure of a destination core. As shown in FIG. 3, a first task 302 from a source processing module is stored in a queue in shared system memory 112, beginning at Address 1. Task 302 is followed by a second task 304 and a third task 306. Tasks 302-306 might be from any processing module (e.g., µP cores 106 or hardware accelerators 108) of network processor 100. Task 306 is followed by a fourth task 308. However, task 308 exceeds a memory boundary of the first memory block of queue 300. In exemplary embodiments of the present invention, the memory boundary of each block is 2KB. Thus, as a source processing module writes task 308 to the queue, the source processing module appends link 310, which provides a pointer to a next, linked, block of memory where the remainder of the fourth task is stored, starting at Address 2. Empty space 312 in the second block is available for additional tasks to be stored therein. Although shown in FIG. 3 as being at the end of the varibaled-sized data block, link 310 might be placed anywhere within the varibaled-sized data block.

To transfer a task to a destination engine (e.g., a destination one of µP cores 106 or hardware accelerators 108), the source engine (e.g., a source one of µP cores 106 or hardware accelerators 108) sends a request on task ring 118. The destination engine responds with the address in system memory 120 where the task is to be written. Upon receiving the response, the source engine writes the task to the memory address, and sends an acknowledgment to the destination engine. The source processing module then writes the address of the next varibaled-sized data block to a fixed location (e.g., the given offset, or the end of the block) within the first block to create a link between the varibaled-sized data blocks. As described herein, the link does not necessarily have to be at the end of the varibaled-sized data block, but can be anywhere within the block. In exemplary embodiments, if tasks are each 256B long and each link is 16B long, the link might be written anywhere after byte 240 in a 2KB block. The source processing module writes partial task data to the first block and any remaining task data to the second block. The destination processing module reads all the tasks sequentially and when it reaches the end of the varibaled-sized data block and there are more tasks to be read, it reads the link in the varibaled-sized data block. When the link comes back from system memory 120, the destination processing module continues to read the tasks. If the destination processing module is capable of consuming the tasks at a fast rate, the time to read the link might undesirably stall the destination processing module as it does not yet have an address from which to read the additional tasks.

Described embodiments prevent the destination processing module from stalling when tasks straddle a memory boundary (e.g., when an entire varibaled-sized data block is read). In described embodiments, the destination processing module tracks when task data is written for the first time to a varibaled-sized data block (e.g., the varibaled-sized data block is a new block). When task data is written for the first time to a new block, the destination processing module sends the address of the new block in the response to the destination engine. As described herein, the destination engine writes the full task and also the link within the varibaled-sized data block.

When the destination engine reads the first task out of a given varibaled-sized data block, the destination processing module also reads the link address. Thus, the link address is preloaded before the destination processing module has read all the tasks from the varibaled-sized data block, and thus the destination processing module is not stalled when task data straddles the memory boundary since the destination module can directly read task data from the next block located at the preloaded link address.

Figure 4:
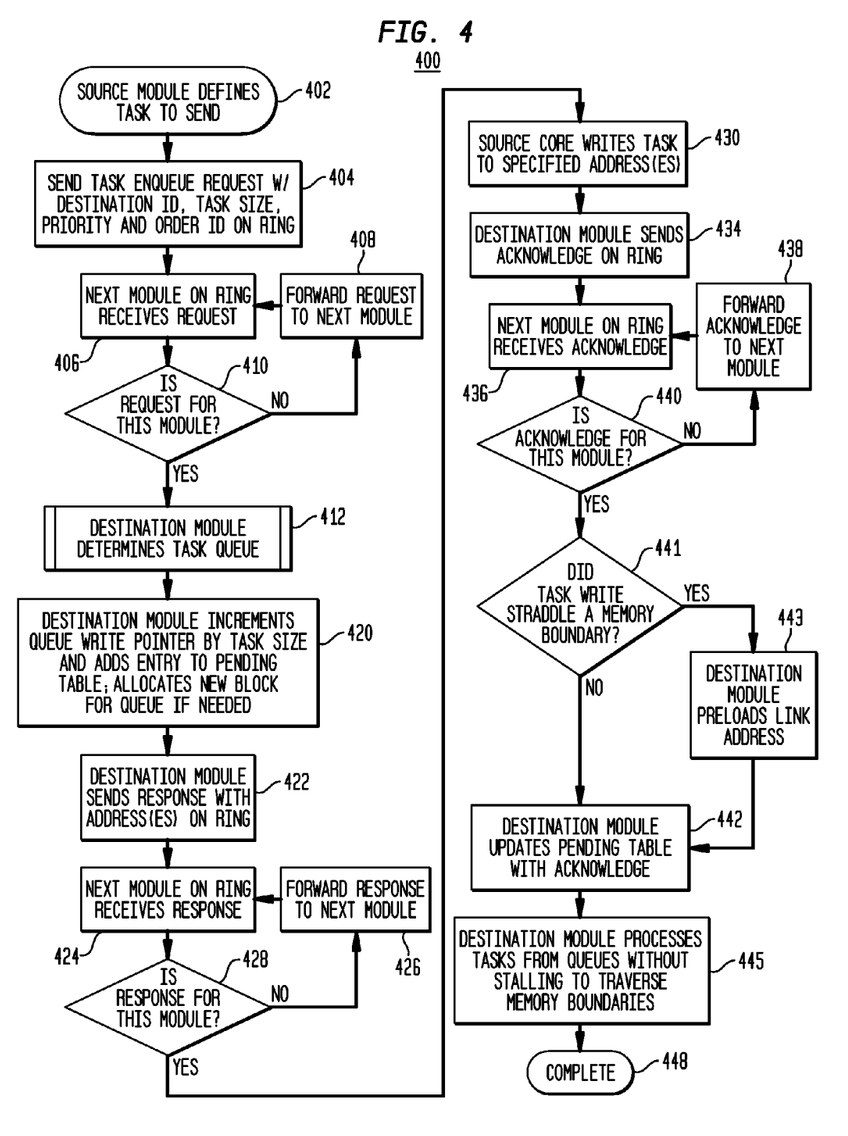
FIG. 4 shows a flow diagram of an exemplary process for sending and processing tasks between one or more processing modules of the network processor of FIG. 1.

FIG. 4 shows a flow diagram of exemplary process 400 for sending tasks between one or more processing modules of network processor 100. At step 402, a source processing module generates a task to be performed by a destination processing module and, at step 404, the source core sends a task request on one of communication rings 118 (e.g., the task ring) with the ID of the destination processing module and other data, such as the priority, ordering type and size of the task. The task request moves from processing module to processing module along task ring 118 until the destination processing module receives the request, as illustrated in steps 406-410. At step 412, the destination processing module determines which of its task queues is to store the task, or whether the queue is full. Embodiments might determine the associated queue substantially as described in U.S. patent application Ser. Nos. 12/782,379, 12/782,393 and 12/782,411, all filed May 18, 2010 and incorporated herein in their entireties by reference.

At step 422, the destination processing module responds to the source processing module with the memory address at which to write the new task, and the response propagates along the task ring until reaching the source core in steps (next module on ring receives response), 426 (forward response to next module), and 428 (test whether response is for this module). As described, when the associated varibaled-sized data block becomes full, the destination processing module sends two addresses in the response to the sourcing engine: (i) the address with the first varibaled-sized data block to start writing the task, and (ii) the beginning address of a next varibaled-sized data block in shared system memory 112. If the associated varibaled-sized data block is not full, the destination processing module sends one address in the response to the sourcing engine: the address within the first varibaled-sized data block to start writing the task.

At step 430, the source core writes the task at the specified address(es) and, at step 434, responds to the destination processing module with an acknowledgement on the task ring. The acknowledgment indicates to the destination processing module that the task data is ready to be read from memory. The acknowledgement propagates around the task ring until the source processing module receives the acknowledgement at steps 436 (next module on ring receives acknowledge), 438 (forward acknowledge to next module), and 440 (test whether acknowledge is for this module). At step 441, if the task write straddled a memory boundary (e.g., task data was written to more than one varibaled-sized data block), then at step 443, the destination processing module preloads the link address value to a local memory, and process 400 proceeds to step 442. Otherwise, at step 441, if the task write did not straddle a memory boundary (e.g., task data was written to only one varibaled-sized data block), then process 400 proceeds to step 442. At step 442, the destination processing module updates a table of pending tasks with the acknowledgement. As described in U.S. patent application Ser. Nos. 12/782,379, 12/782,393 and 12/782,411, all filed May 18, 2010, since there might be several tasks being written in a given queue at any time, the queues are able tolerate gaps in the queue if a later arriving task completes a write to cache before the earlier task finishes writing the queue. At step 445, the destination processing module reads a next task from the task queue (or from one of multiple task queues). Since link address values are preloaded by the destination processing module each time a task write straddles a memory boundary, at step 445, the destination processing module processes tasks from the queue(s) without stalling to read a link memory address. At step 448 task transfer and processing routine 400 completes.

Thus, described embodiments provide processing of a received packet of a network processor by generating one or more tasks corresponding to each received packet. A destination processing module receives a task and determines, based on the task size, an associated queue in which to store the task, and whether the task is larger than space available within a current memory block of the associated queue. If the task is larger than space available within the current memory block of the associated queue, an address of a next memory block in a shared memory is determined, and the address is provided to a source processing module of the task. The source processing module writes the task to the shared memory based on a provided offset address and the address of the next memory block, if provided. If a task is written to more than one memory block, the destination processing module preloads the address of the next memory block to a local memory to process queued tasks without stalling to retrieve the address of the next memory block from the shared memory.

Thus, as described herein, described embodiments provide a packet classifier for a network processor that generates tasks corresponding to each received packet. The packet classifier includes a scheduler to generate contexts corresponding to tasks received by the packet classifier from a plurality of processing modules of the network processor. The packet classifier processes threads of instructions, each thread of instructions corresponding to a context received from the scheduler, and each thread associated with a data flow. A thread status table has N entries to track up to N active threads. Each status entry includes a valid status indicator, a sequence value, a thread indicator and a flow indicator. A sequence counter generates a sequence value for each data flow of each thread and is incremented when processing of a thread is started, and is decremented when a thread is completed. Instructions are processed in the order in which the threads were started for each data flow.

While the exemplary embodiments have been described with respect to processing blocks in a software program, including possible implementation as a digital signal processor, micro-controller, or general-purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

Described embodiments might also be embodied in the form of methods and apparatuses for practicing those methods. Described embodiments might also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Described embodiments might can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. Described embodiments might also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various described embodiments.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts that have been described and illustrated in order to explain the nature of this invention might be made by those skilled in the art without departing from the scope of the invention as expressed in the following claims.

We claim:

1. A method of processing a received packet of a network processor, wherein the network processor comprises a plurality of processing modules and at least one shared memory, the method comprising:
   generating one or more tasks corresponding to each received packet;
   sending, by a source processing module, a task message corresponding to a corresponding task to a destination processing module, the task message comprising a task identifier and a task size;
   receiving, by the destination processing module, the task message;
   determining, by the destination processing module based on the task size, (i) an associated one of a plurality of task queues of the destination processing module in which to store the task, wherein each queue comprises one or more memory blocks in the at least one shared memory, and (ii) whether the task is larger than space available within a current memory block of the associated queue;
   if the task is larger than space available within a current memory block of the associated queue:
      determining an address of a next memory block in the at least one shared memory for the associated queue, and providing the address of the next memory block to the source processing module;
   providing an offset address within the current memory block of the associated queue to the source processing module;
   writing, by the source processing module, the task to the at least one shared memory based on at least one of the provided offset address and the address of the next memory block, if provided;
   if a task is written to more than one memory block of the associated queue:
      preloading, by the destination processing module, the address of the next memory block to a local memory of the destination processing module; and
   processing, by the destination processing module, queued tasks without stalling to retrieve the address of the next memory block from the at least one shared memory.

2. The method of claim 1, further comprising:
   writing, by the source processing module, the address of the next memory block as a link address in a previous memory block of the associated queue.

3. The method of claim 2, further comprising:
   writing, by the source processing module, the link address at the end of the previous memory block.

4. The method of claim 2, wherein, for the method, each memory block is 2KB, each task is 256B and each link address is 16B.

5. The method of claim 4, further comprising:
   writing the link address after byte 240 in the 2KB memory block.

6. The method of claim 1, further comprising:
   if the task is larger than space available within a current memory block of the associated queue:
      requesting, by the destination processing module, one or more additional memory blocks from a memory manager of the network processor; and
      if one or more memory blocks are available:
         allocating, by the memory manager, the requested one or more additional memory blocks to the destination processing module to store additional new tasks in the given queue.

7. The method of claim 1, further comprising:
   sending each task and each task request between processing modules over one or more unidirectional ring buses, each ring bus coupled between two adjacent processing modules.

8. The method of claim 7, further comprising:
   determining, by each processing module, if the processing module is an associated destination processing module for a received task message and,
   if so, the processing module processes the task message;
   otherwise, the processing module passes the task message unchanged to an adjacent one of the processing modules coupled to the ring busses.

9. The method of claim 8, wherein each task comprises at least one of: (i) pointers to data stored in the at least one memory, (ii) inline data corresponding to the task message, (iii) control data corresponding to the task message, and (iv) a flow identifier corresponding to the task.

10. The method of claim 9, further comprising:
determining, based on the corresponding flow identifier, a processing order for each task through one or more of the plurality of processing modules of the network processor.

11. The method of claim 10, wherein the processing modules comprise at least one of a programmable processor and a dedicated hardware accelerator.

12. A non-transitory machine-readable medium, having encoded thereon program code, wherein, when the program code is executed by a machine, the machine implements a method of processing a received packet of a network processor, wherein the network processor comprises a plurality of processing modules and at least one shared memory, the method comprising:
generating one or more tasks corresponding to each received packet;
sending, by a source processing module, a task message corresponding to a corresponding task to a destination processing module, the task message comprising a task identifier and a task size;
receiving, by the destination processing module, the task message;
determining, by the destination processing module based on the task size, (i) an associated one of a plurality of task queues of the destination processing module in which to store the task, wherein each queue comprises one or more memory blocks in the at least one shared memory, and (ii) whether the task is larger than space available within a current memory block of the associated queue;
if the task is larger than space available within a current memory block of the associated queue:
determining an address of a next memory block in the at least one shared memory for the associated queue, and providing the address of the next memory block to the source processing module; and
writing, by the source processing module, the address of the next memory block as a link address in a previous memory block of the associated queue;
providing an offset address within the current memory block of the associated queue to the source processing module;
writing, by the source processing module, the task to the at least one shared memory based on at least one of the provided offset address and the address of the next memory block, if provided;
if a task is written to more than one memory block of the associated queue:
preloading, by the destination processing module, the address of the next memory block to a local memory of the destination processing module; and
processing, by the destination processing module, queued tasks without stalling to retrieve the address of the next memory block from the at least one shared memory.

13. The non-transitory machine-readable medium of claim 12, further comprising:
writing, by the source processing module, the link address at the end of the previous memory block, and wherein, for the method, each memory block is 2KB, each task is 256B and each link address is 16B.

14. The non-transitory machine-readable of claim 13, further comprising:
writing the link address after byte 240 in the 2KB memory block.

15. The non-transitory machine-readable of claim 12, further comprising:
if the task is larger than space available within a current memory block of the associated queue:
requesting, by the destination processing module, one or more additional memory blocks from a memory manager of the network processor; and
if one or more memory blocks are available:
allocating, by the memory manager, the requested one or more additional memory blocks to the destination processing module to store additional new tasks in the given queue.

16. The non-transitory machine-readable of claim 12, further comprising:
sending each task and each task request between processing modules over one or more unidirectional ring buses, each ring bus coupled between two adjacent processing modules;
determining, by each processing module, if the processing module is an associated destination processing module for a received task message and,
if so, the processing module processes the task message;
otherwise, the processing module passes the task message unchanged to an adjacent one of the processing modules coupled to the ring busses.

17. The non-transitory machine-readable of claim 16:
wherein each task comprises at least one of: (i) pointers to data stored in the at least one memory, (ii) inline data corresponding to the task message, (iii) control data corresponding to the task message, and (iv) a flow identifier corresponding to the task, the method further comprising:
determining, based on the corresponding flow identifier, a processing order for each task through one or more of the plurality of processing modules of the network processor.

18. A network processor having a plurality of processing modules and at least one shared memory, wherein the network processor generates one or more tasks corresponding to each of a plurality of received packets, the network processor comprising:
a communication interface configured to generate one or more tasks corresponding to each received packet;
a source processing module configured to send a task message corresponding to a corresponding task to a destination processing module, the task message comprising a task identifier and a task size;
the destination processing module configured to:
receive the task message;
determine, based on the task size, (i) an associated one of a plurality of task queues of the destination processing module in which to store the task, wherein each queue comprises one or more memory blocks in the at least one shared memory, and (ii) whether the task is larger than space available within a current memory block of the associated queue;
if the task is larger than space available within a current memory block of the associated queue:
determine an address of a next memory block in the at least one shared memory for the associated queue, and providing the address of the next memory block to the source processing module; and
provide an offset address within the current memory block of the associated queue to the source processing module;
the source processing module is configured to:
write the address of the next memory block, if provided, as a link address in a previous memory block of the associated queue;

write the task to the at least one shared memory based on at least one of the provided offset address and the address of the next memory block, if provided;

if a task is written to more than one memory block of the associated queue:

the destination processing module is configured to preload the address of the next memory block to a local memory of the destination processing module and process queued tasks without stalling to retrieve the address of the next memory block from the at least one shared memory.

19. The network processor of claim 18, further comprising:

if the task is larger than space available within a current memory block of the associated queue:

the destination processing module is further configured to request one or more additional memory blocks from a memory manager of the network processor; and if one or more memory blocks are available, the memory manager is configured to allocate the requested one or more additional memory blocks to the destination processing module to store additional new tasks in the given queue.

20. The network processor of claim 18, wherein the network processor is implemented in an integrated circuit chip.

* * * * *